United States Patent [19]
Mitchell et al.

[11] 4,022,924
[45] May 10, 1977

[54] DRY ACIDULENTS

[75] Inventors: William Alexander Mitchell, Lincoln Park, N.J.; William Charles Seidel, Monsey, N.Y.

[73] Assignee: General Foods Corporation, White Plains, N.Y.

[22] Filed: May 13, 1974

[21] Appl. No.: 469,158

[52] U.S. Cl. .................... 426/650; 426/590; 426/661

[51] Int. Cl.² .................... A23L 2/00; A23L 1/226

[58] Field of Search .......... 426/650, 661, 590, 591, 426/658; 127/70, 71

[56] References Cited

UNITED STATES PATENTS 3,657,010  4/1972  Mitchell ..................... 426/661 X

*Primary Examiner*—Lionel M. Shapiro
*Attorney, Agent, or Firm*—Bruno P. Struzzi; Daniel J. Donovan; Doris M. Bennett

[57] ABSTRACT

Dry, free flowing acid compositions may be prepared from liquid acid by co-drying a mixture of the liquid acid with a soluble carbohydrate.

11 Claims, No Drawings

DRY ACIDULENTS

BACKGROUND OF THE INVENTION

This invention relates to liquid acid-containing solids for food products and more particularly, to dry, free-flowing powders containing substantial amounts of a liquid acid.

Liquid edible carboxylic food acids such as acetic acid, lactic acid, as well as phosphoric acid, acid phosphate salts and the like are commonly used as acidulating ingredients of edible liquid compositions to provide a desirable acid taste or tang. Historically, phosphates and phosphoric acid have been considered uniquely suited to application in foodstuffs, not only due to their favorable taste when compared with other strong mineral acids and their salts but also due to the fact that they are less expensive than other liquid organic acids. However, liquid phosphoric acid cannot be incorporated into dry powdered formulations as readily as can the solid organic acid. Dry solid acidulents containing phosphoric acid have not been successful because a large amount of a solid, dry carrier has been required in such mixtures in order that a dry free-flowing product containing a substantial amount of the acid might be provided. If a sufficient quantity of such an acidulent composition were to be added to the food product to provide the desired acidity, the resulting large amount of solid carrier would present problems in taste, appearance or feel of the food produced. On the other hand, increasing the amount of phosphoric acid relative to the amount of the carrier provides a desirable acid taste or tang but causes the mix of acid and carrier to be too wet and therefore to cake excessively.

Recent attempts to produce dry free-flowing powders from liquid acids which have been directed mainly to phosphoric acid and their solid acid salts are numerous. For example, U.S. Pat. No. 3,030,213 issued Apr. 17, 1962 discloses a dry acidulent for use in food and beverage formulations comprising a solid acid salt of phosphoric acid, phosphoric acid and sulphuric acid. The mixture comprises from 76 to 95% acid salt, from 3.5 to 22% phosphoric acid, and from 0.1 to 2% sulphuric acid. The above reference discloses in column three admixing the acids and salt at ambient temperatures followed by drying at around 100° C.

Similarly, Miller in U. S. Pat. No. 2,715,059 issued Aug. 9, 1955 discloses a method of preparing a dry phosphoric acid-containing composition by admixing phosphoric acid with sodium acid pyrophosphate at ambient temperatures and heating the mixture in order to promote the "reaction".

Finally U. S. Pat. No. 3,657,010 issued Apr. 8, 1972 teaches acid-heat treatment of a hydrolyzed starch, specifically, heating a non-bulking hydrolyzed starch material having up to fifty percent monosaccharides with phosphoric acid to temperatures in the range of about 300° F to 370° F. The molten mass is allowed to slowly cool and solidify and the resulting solid is ground into a powder.

It will be noted that the prior attempts to produce a stable free flowing acid powder directed primarily to a free flowing phosphoric acid containing powder has necessitated higher temperatures and in some cases added ingredients. Higher temperatures have traditionally been necessary in order to polymerize the carbohydrate material. This resulted in an anhydrous material which was relatively non-hygroscopic. In most instances these heat-treated dry acid compositions as well as those containing added ingredients are extremely susceptible to undergoing a browning reaction due at least in part to the acid having reacted with the carbohydrate material.

SUMMARY OF THE INVENTION

It is a feature of this invention to provide a dry, free-flowing acid composition comprised primarily of a soluble carbohydrate and a liquid food acidulent which composition has an acid fix of up to 30% of the liquid acid and gives a white free-flowing powder without the necessity of reacting the acid with the carbohydrate and which is stable at room temperature and devoid of any tendency to undergo the browning reaction.

The carbohydrates of the present invention are those special dextrins having low dextrose equivalent values of from about 1 DE to about 15 DE and which are excellent film-forming materials. Such special dextrins have a DP (degree of polymerization) of from about 1 to about 20 glucose units with an average DP of about 10. Furthermore, in comparison with the normal dextrins disclosed in the previously mentioned patent U.S. Pat. No. 3,657,010 which contain large amounts of monosaccharides, the special dextrins which can be produced by enzymatic hydrolysis (eg. alphaamylase from B. Subtilis) contain about 10% less polymers in the DP range of about 10 than the normal dextrins having the same DE and they have a preponderance of trimer, hexamer and heptamer content equivalent to more than 50% of the oligomers (DP 10 and below). Additionally, the special dextrins have only a trace to about 1% glucose and a very limited amount of maltose.

The method which may be employed throughout this invention in order to drive the free-flowing dry acid powder is codrying of the liquid acid and special dextrin mixture by drying methods known in the art to be effective in terms of drying without at the same time hydrolyzing the mixture, for example, spray drying, freeze drying, vaccum drying or the like.

It is therefore a principle feature of this invention to provide dry non-hygroscopic acidulent compositions which do not require excessive heating in order to derive free-flowing powders which can be hermetically packaged and stored for long periods of time without caking and without browning.

It is yet another object of the invention to provide a powder which contains up to 30% liquid acid and is also amenable to the sorption of other flavoring agents.

These features can be accomplished by co-drying the liquid acid with special dextrins by drying methods known in the art not to effect hydrolysis such that the acid would react with the dextrin.

DESCRIPTION OF THE INVENTION

It has unexpectedly been found that certain dextrin materials can be co-dried with liquid acids under conditions which do not effect hydrolysis of the composition to derive white free-flowing unreacted dry acid compositions which have a higher acid fixation and greater stability than typical hydrolyzed dry acid dextrin compositions.

The dextrin material used in accordance with this invention are those dextrins which have a preponderance of oligomers and which have a dextrose equivalent of up to 15 and preferably should be below about 10 DE; the range of 1 to 5 DE being preferred. In addition, these dextrins dissolve easily in water to give clear solutions.

These special dextrins may be either in syrup or solid form. The syrup may be a commercially available syrup or may be prepared by dissolving the dextrin solids in a liquid medium. The low to non-hazing dextrins having a DE of 5 or less are the preferred hydrolyzed starch materials where the syrup is employed for previously mentioned reasons of their ability to fix higher concentrations of acid and to produce more stable dry acid compositions in general.

Special hydrolyzed starch syrups or solids such as those produced by the modification of a granular starch to a DE of less than 1 or gelatinized modified granular starches having also a DE of less than 1 may also be used to obtain an acid starch powder which is non-hazing and has a lower bulk density, lower hydroscopicity and better film-forming properties than similar low DE nonhazing dextrins. Although these modified and gelatinized modified starches are apprecialy better liquid acid fixatives than for example, typical unmodified starches in terms of fixing higher concentrations of said acids, their resistance to browning is not so good as the previously mentioned special dextrins and therefore, the latter are the preferred carbohydrate materials for use in this invention.

The acids suitable for use in this invention can be any of the acceptable liquid food acids, either organic or inorganic phosphoric acid and the acid salts of phosphoric acid being the best known and preferred acids of this class of food acids due to the higher concentration of phosphoric acid and phosphate salts which may be fixed according to the method of this invention. Where the acid salts of phosphoric acid are employed either alone or in combination with phosphoric acid itself or any other liquid sweetener, the phosphate salts preferrably employed are monosodium orthophosphate, monopotassium orthophosphate, monocalcium orthophosphate, or mixtures of these salts. Other soluble phosphate salts such as di-sodium or di-hydrogen pyrophosphate can be used, although only small amounts of the latter should be employed, usually in conjunction with orthophosphates, because the pyrophosphates impart a peculiarly bitter aftertaste to food products if used in too large amounts. The phosphate may contain water of hydration although not in excessive amounts.

The acidulent compositions of this invention may be prepared by co-drying a liquid concentrated acid with the dextrin or modified starch material either alone or in combination with other ingredients by drying methods known in the art not to effect hydrolysis of the product such as by spray drying, vacuum drying, freeze drying, or the like, spray drying being preferred. This ordinarily means that the liquid acid and starch composition will not be subjected to drying wherein the temperature of the liquid acid and starch composition exceeds about 90° C. In the case of spray drying, this means the inlet temperature should not exceed about 200° which will result in an outlet temperature of about 90° C. The liquid acids may also be sprayed onto the bulk dextrin so that the liquid ingredients are uniformly distributed and absorbed on the surfaces of the solid dextrin particles. It is preferred however, that the composition be co-dried to the lowest moisture level possible in order to derive the most stable dry acid composition.

If desired the finished acidulent may be blended with one or more of the other ingredients of the particular product into which it is to be incorporated such as the ingredients of a dessert or beverage powder such as sugar or an effective amount of a flavoring material, citric acid, and may be stored for long periods of time without caking and without browning.

It will be apparent that the ingredients of the present dry acidulents may be incorporated directly into the food or beverage to be acidified without being combined before use in a dry composition since no reaction between the components of this invention is required. This essentially will involve co-drying the entire food product or majority of the ingredients without first combining the dextrin and/or modified starch and liquid acid.

A study was conducted in order to determine not only the maxiumum amount of phosphoric acid which could be fixed onto the preferred fixative materials of this invention but also to determine at what level, if any, browning occurred.

Table 1 shows the color of the dry powders produced by co-drying various special dextrins with phosphoric acid. It should be noted that of the materials evaluated only the 5 DE MOR-REX (commercial dextrin) produces a stable white powder when fixed at a 30% phosphoric acid level. It is hypothesized that the stability is attributed to the high concentrations of trimer, hexamer, and heptamer present in this type of dextrin. Furthermore, only the samples co-dried with 5 DE MOR-REX produced water clear solutions in cold water without flavor.

The samples disclosed in Table I were all spray dried under identical test conditions which were as follows: Niro spray dryer maintained at between 145° to 175° C and dried materials stored at 90° F/70% relative humidity.

TABLE I

Some Properties of Various Spray Co-dried Dextrins and Phosphoric Acid

| Dextrin | % Phosphoric Acid | Color of Product |
| --- | --- | --- |
| Maltrin 10 | 30% | Dark brown - gray |
| Capsul (emulsifier dextrin) | 30% | Tan |
| National 51-6190 (normal starch) | 30% | Black |
| MOR-REX 1918 | 30% | Green-yellow |
| MOR-REX 1918 | 25% | Slight yellow |
| MOR-REX 5 DE | 5% | White |
| MOR-REX 5 DE | 10% | White |
| MOR-REX 5 DE | 15% | White |
| MOR-REX 5 DE | 20% | White |
| MOR-REX 5 DE | 25% | White |
| MOR-REX 5 DE | 30% | White |
| MOR-REX 5 DE | 40% | No value; Glassy |

It will be noted from the results of Table I that the dextrin material having a DE of 5 not only produces a more stable product in terms of resistance to browning but the 5 DE MOR-REX (of the dextrins evaluated) had the greatest fixation properties while still retaining its anti-browning character.

The dry powders formed in accordance with this invention, namely, liquid acids fixed in dextrins having a preponderance of oligomers and a DE of preferably no higher than 15 and/or special hydrolyzed starches having a DE of less than 1 when stored in glass jars or in hermetically-sealed packages at normal room conditions of temperature and moisture, do not exhibit any evidence of browning. This is not possible when, for example, corn syrup solids having high concentrations of monosaccharides and especially those having in addition a DE higher than about 15 treated by the method of this invention are similarly exposed.

This invention is further illustrated but not limited by the following examples.

EXAMPLE I 300 gm. of 5 DE MOR-REX is dissolved in 600 ml. of water. To this mixture is added 117 gm of 85% phosphoric acid. The mixture is spray dried in the Niro spray drier with an air in-let temperature of 130° to 140° C. A white stable powder is produced that contains about 30% phosphoric acid.

The white powder is easily soluble in cold water to give a water white solution. On titration it is found that two acid groups may be titrated to pH 9 and on this basis it has been determined that all of the acid is fixed according to this method. The titration value further reveals that the phosphoric acid is free or is easily released from the carbohydrate when dissolved in cold water.

EXAMPLE II 200 gm 5 DE dextrin is dissolved in 400 ml of water. To this mixture is added the following:
- 64 gm. monosodium phosphate hydrate
- 92 gm. monocalcium phosphate hydrate
- 44 gm. phosphoric acid (85%)

The mixture is spray dried at 160° to 170° C in-let temperature. A stable white powder is produced. All the added phosphoric acid can be found based on two acid groups by titration to pH 9.

What is claimed is:

1. A method of making a free-flowing dry acid powder composition containing up to about 30% acid which powder is stable at room temperature and has a reduced tendency to undergo the browning reaction, which method comprises the steps of:
    a. selecting a carbohydrate from the group consisting of dextrins having a preponderance of oligomers and a DE of about 1 to about 15, hydrolyzed granule starches having a DE of less than about 1, gelatinized hydrolyzed granule starches having a DE of less than about 1 and combinations thereof; and
    b. co-drying the carbohydrate with a liquid acid by drying wherein the temperature of the liquid acid and the carbohydrate does not exceed about 90° C.

2. The method of claim 1 wherein the carbohydrate material is a dextrin.

3. The method of claim 2 wherein the dextrin has a DE of about 1 to 10.

4. The method of claim 3 wherein the dextrin has a DE of about 1 to 5.

5. The method of claim 2 wherein the dextrin is further characterized by having a degree of polymerization of from about 1 to about 20.

6. The method of claim 1 wherein the liquid acid is phosphoric acid.

7. The method of claim 1 wherein the liquid acid is acetic acid.

8. The method of claim 1 wherein the liquid acid is lactic acid.

9. The method of claim 1 wherein the carbohydrate material and liquid acid are spray dried.

10. The method of claim 1 wherein the carbohydrate is a dextrin, the liquid acid is phophoric acid and the dextrin and phosphoric acid are spray dried under conditions whereas the dextrin sorbs 30% phosphoric acid by weight of the resulting phosphoric acid-containing powder.

11. The product of the process of claim 1.

* * * * *